| (12) | United States Patent | (10) Patent No.: | US 7,011,439 B1 |
|---|---|---|---|
| | Kane et al. | (45) Date of Patent: | Mar. 14, 2006 |

(54) ADJUSTABLE SPOTLIGHT FITTING FOR FIBER OPTIC LIGHTING

(75) Inventors: Kenneth M. Kane, Trumbull, CT (US); Jeremy S. Brotchner, Forest Hills, NY (US)

(73) Assignee: Lighting Services Inc., Stony Point, NY (US)

( * ) Notice: Subject to any disclaimer, the term of this patent is extended or adjusted under 35 U.S.C. 154(b) by 230 days.

(21) Appl. No.: 10/680,981

(22) Filed: Oct. 8, 2003

Related U.S. Application Data

(60) Provisional application No. 60/418,060, filed on Oct. 11, 2002.

(51) Int. Cl.
*F21V 7/04* (2006.01)
*G02B 6/04* (2006.01)

(52) U.S. Cl. ............... 362/554; 362/269; 362/287; 362/319; 362/364; 362/428

(58) Field of Classification Search ........... 362/269, 362/285, 287, 319, 364–366, 371–372, 418–430, 362/457, 551, 554
See application file for complete search history.

(56) References Cited

U.S. PATENT DOCUMENTS

| 2,922,030 | A | * | 1/1960 | Bobrick | 362/366 |
| 3,803,400 | A | * | 4/1974 | Ozawa | 362/372 |
| 5,070,434 | A | * | 12/1991 | Suman et al. | 362/490 |
| 5,377,087 | A | * | 12/1994 | Yoon | 362/275 |
| 5,404,297 | A | * | 4/1995 | Birk et al. | 362/421 |
| 5,560,707 | A | * | 10/1996 | Neer | 362/376 |
| 6,058,230 | A | * | 5/2000 | Ward | 385/33 |
| 6,371,628 | B1 | * | 4/2002 | Ward | 362/287 |
| 6,454,439 | B1 | * | 9/2002 | Camarota | 362/293 |

* cited by examiner

*Primary Examiner*—Stephen Husar
*Assistant Examiner*—Jason Han
(74) *Attorney, Agent, or Firm*—Schweitzer Cornman Gross & Bondell LLP

(57) ABSTRACT

An adjustable spotlight fitting for use with an illuminated fiber optic bundle. A spherically contoured pivot element is received within a pivot housing and retained therein by an adjustable locking ring which clamps the pivot element in any angularly adjusted position. A focusing member is mounted by the pivot element for limited axial adjusting movement in relation thereto. A fiber optic bundle is inserted through the back of the pivot element and the exposed optical fibers at its terminal end are positioned within the focusing member. A lens, carried at the outer end of the focusing member, is movable by the focusing member toward and away from the fiber optic bundle for converging and expanding the area of illumination. Optical filters can be selectively installed behind the lens for various lighting effects.

10 Claims, 3 Drawing Sheets

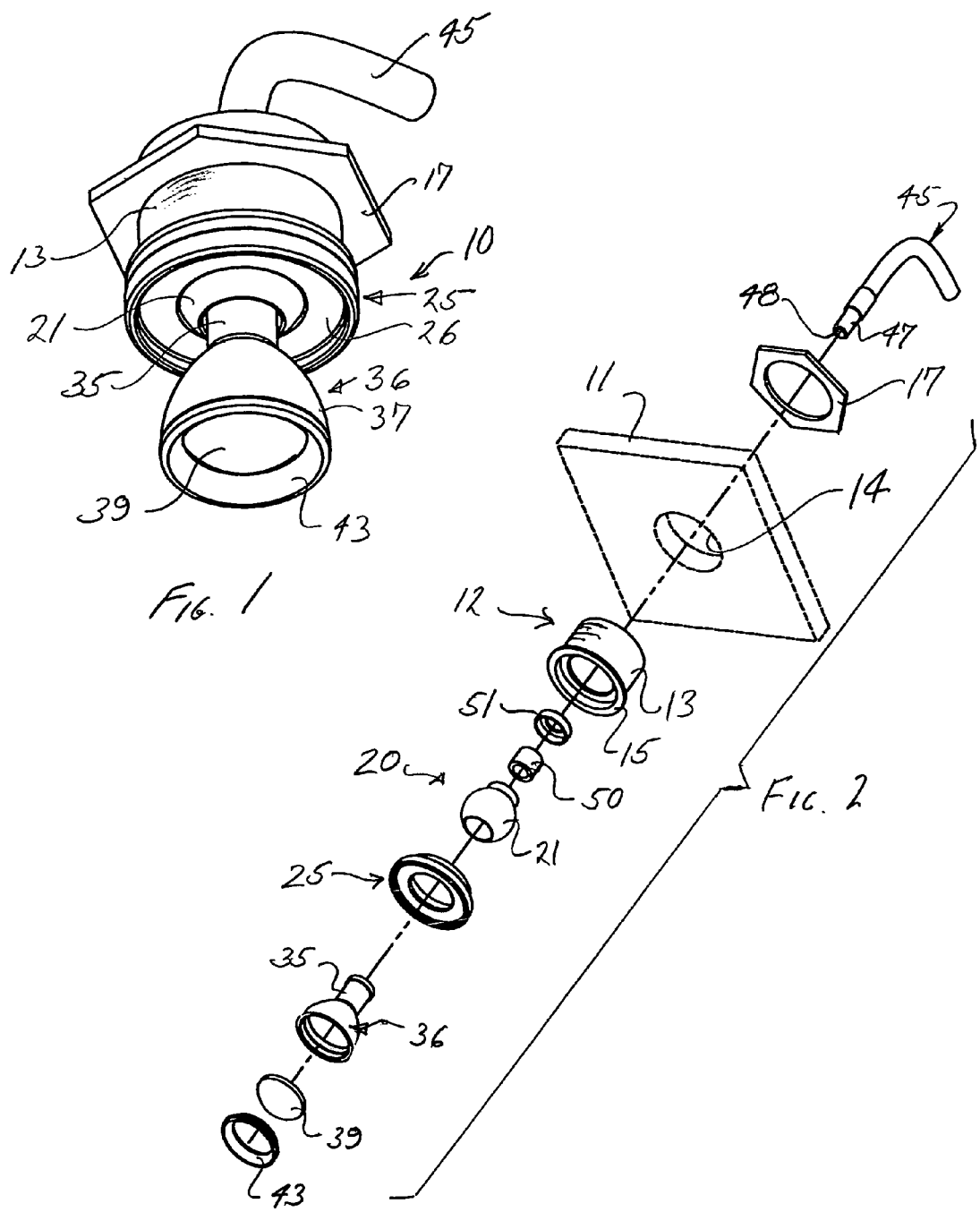

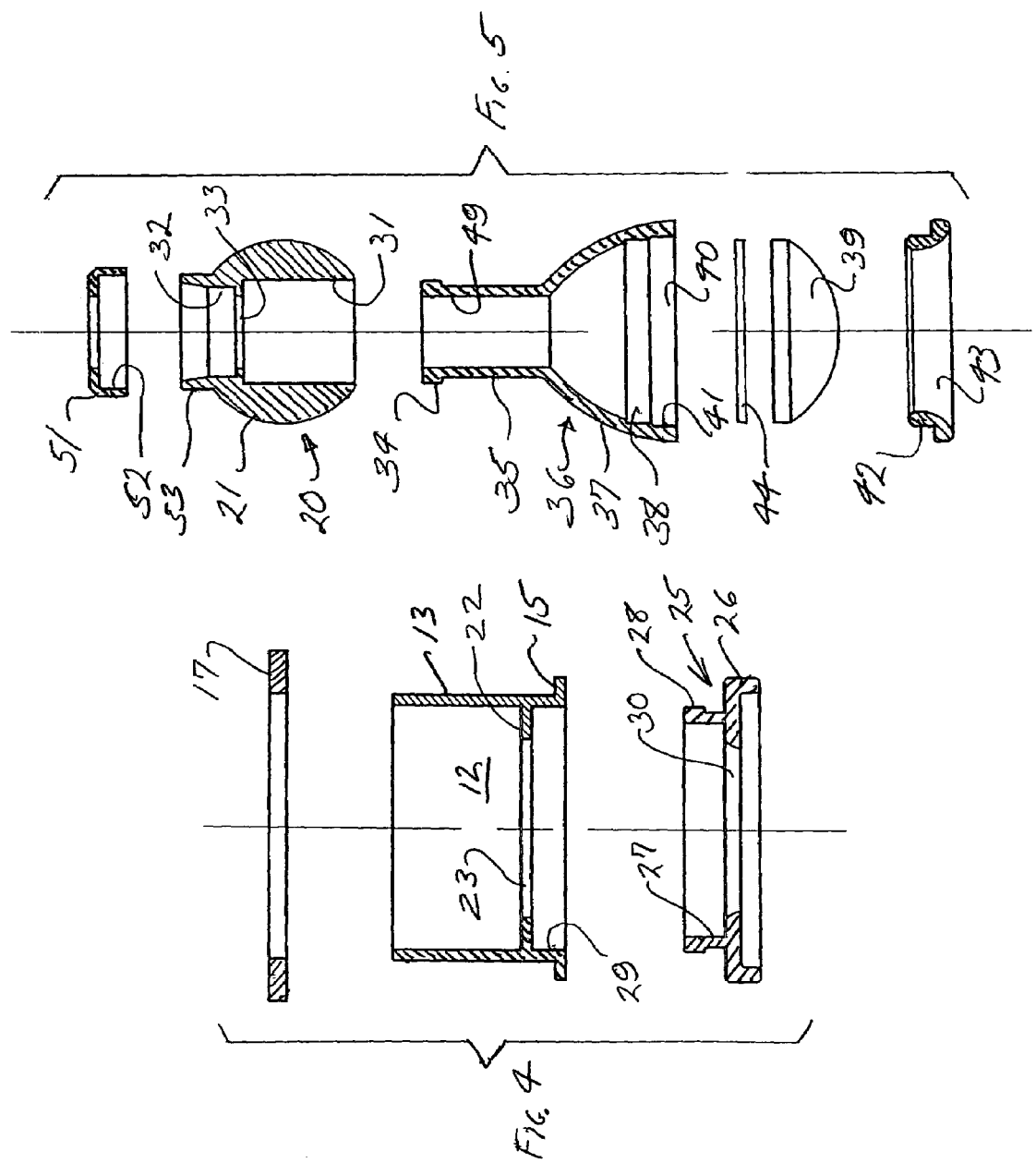

ADJUSTABLE SPOTLIGHT FITTING FOR FIBER OPTIC LIGHTING

RELATED APPLICATIONS

This application is related to and claims the priority of Provisional Application Ser. No. 60/418,060, filed Oct. 11, 2002.

BACKGROUND OF THE INVENTION

In fiber optic lighting systems, a bundle of fibers, connected at one end to a remote light source, is led to a light emitting spotlight fitting through which the light is discharged on the subject area to be illuminated. Depending upon the desires of the designer, the light received through the fiber optic bundle can be expanded, shaped, concentrated, directionally oriented or some combination of one or more of the foregoing by the light emitting spotlight fitting. The present invention is directed to a novel and improved such spotlight fitting providing for easily adjustable control of the emission of light from a fiber optic bundle.

SUMMARY OF INVENTION

Fiber optic lighting systems are advantageously employed in a wide variety of environments, among which are the lighting of merchandise displays. An example of such is the lighting of display cases for jewelry or the like. One or more fiber optic bundles are directed to individual discharge locations and are joined at their distal ends with light emitting terminal fittings which cause the light to be cast upon the desired areas. In many displays of this general type, it is desirable to aim and/or focus the light emitting fittings so that they cast light upon areas of specific size and location. Additionally, it is desirable that the fittings be provided with easily accessible elements to accommodate focus and/or aiming adjustments as desired for the display.

In accordance with one aspect of the present invention, a light emitting spotlight fitting is provided which includes an adjustably positionable lens holder and reflective shroud, which can be quickly and easily released and repositioned and then resecured in a desired focus and/or orientation. In the device of the invention, the desired functions are provided in a highly simplified structure, which can be economically manufactured and installed and easily used.

In a preferred embodiment of the invention, a lens holder and reflective shroud are adjustable linearly with respect to the distal end of a fiber optic cable bundle, to provide for focus adjustment of the illumination emitted from the spotlight fitting, enabling the illuminated display area to be enlarged or contracted as needed or desired for a particular display.

Provisions also are made for universal pivoting movement of the reflective shroud, in addition to the linear focus adjustments, all with a device of simplified, inexpensive construction which can be easily installed and thereafter easily adjusted and manipulated without tools.

For a better understanding of the above and other features and advantages of the invention, reference should be made to the following detailed description of a preferred embodiment of the invention and to the accompanying drawings.

DESCRIPTION OF THE DRAWINGS

FIG. 1 is a perspective view of an adjustable spotlight fitting according to the invention.

FIG. 2 is an exploded view of the adjustable spotlight fitting of FIG. 1

FIG. 4 is an exploded view showing details of a pivot housing and associated elements forming part of the device of FIG. 1.

FIG. 5 is an exploded cross sectional view of a reflective shroud and associated elements forming part of the device of FIG. 1.

DESCRIPTION OF PREFERRED EMBODIMENT

Figure 3:
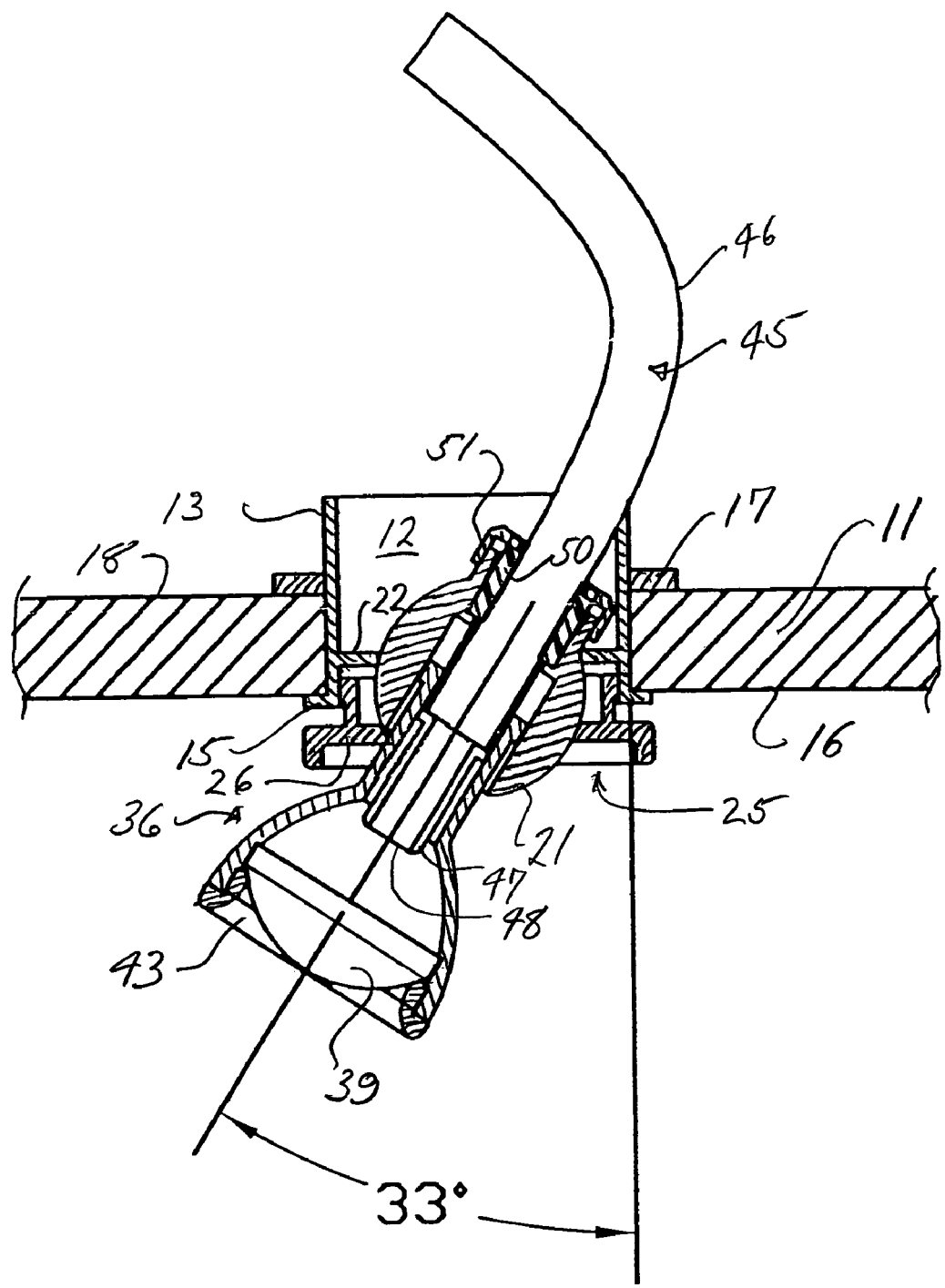
FIG. 3 is an enlarged, cross sectional view of the adjustable spotlight fitting of FIG. 1.

Referring now to the drawing, the reference numeral 10 designates generally the spotlight fitting of the invention, which is adapted for convenient mounting in a panel 11, typically forming a wall of a display case or the like. The device of the invention includes a pivot housing 12, typically formed of aluminum and having a cylindrical body portion 13 for reception in an opening 14 provided therefore in the panel 11. A circular flange 15 extends outward from the forward end of the pivot housing 12 and is adapted to be seated against the outer face 16 of the panel 11, generally as shown in FIG. 3.

In the illustrated form of the invention, the outer surface of the cylindrical body portion 13 of the pivot housing is threaded, for threaded engagement with a mounting nut 17. As indicated in FIG. 3, when the pivot housing is installed in the panel 11, the back end of the pivot housing projects through the opening 14 for engagement by the nut 17. The nut is threadedly advanced along the pivot housing to engage the back surface 18 of the panel 11 and fix the pivot housing in position on the panel.

A pivot element 20, typically formed of aluminum and having a spherically contoured outer surface portion 21, is arranged to be seated within the pivot housing 12, as shown particularly in FIG. 3. To this end, the pivot housing 12 is formed with an internal flange 22 defining an internal aperture 23, the diameter of which is somewhat less than the diameter of the spherical portion 21 of the pivot element. In one preferred embodiment of the invention, for example, the spherical portion 21 may have a diameter of approximately 1.044 inches, while the diameter of the internal opening 23 may be on the order of 1.010 inches. The arrangement is such that the spherical portion seats well into the opening 23, as shown generally in FIG. 3.

In a preferred embodiment of the invention, the spherical portions 21 of the pivot element 20 comprise most of its surface, except for a short tubular extension at the back (to be described hereafter) and a cylindrical opening at the front.

A locking ring 25 (FIGS. 3 and 4), which also may be formed of aluminum, is provided for retaining the pivot element 21 in its seated position within the pivot housing. The locking ring has a front flange portion 26 and a rearwardly projecting cylindrical wall 27 provided along rearward portions of its outer surface with a threaded portion 28. The threaded portion 28 is arranged for threaded engagement with an internally threaded portion 29 of the pivot housing 12. Thus, after the pivot element 21 is seated in the pivot housing, the locking ring 25 is threadedly applied to the forward portion of the pivot housing, with forward portions of the pivot element 21 being seated in a contoured central opening 30 in the locking ring.

Pursuant to the invention, when the locking ring is threadedly tightened with respect to the pivot housing, the pivot element 21 is clamped between the internal flange 22 of the pivot housing and the front flange 26 of the locking ring, serving to lock the pivot element 21 in a predetermined position. By threadedly loosening the locking ring 25, the pivot element 21 is released for universal pivoting adjustment in any direction, within the pivot limits of the unit, in the illustrated case approximately 33 degrees from the longitudinal axis of the device, in any direction.

As shown particularly in FIG. 5, the pivot element 20 is provided with front and back coaxially aligned cylindrical recesses 31, 32 which are joined via an intermediate opening 33. The front recess 31 is internally threaded throughout most of its length, for threaded engagement with a threaded end portion 34 provided at the rearward end of a focusing member 36. The focusing member 36, which may be formed of aluminum, includes a tubular extension 35 projecting rearwardly from a reflecting shroud 37. The tubular extension 35 has an internal passage 49 extending throughout and opening into the interior of the shroud 37.

The shroud 37 is provided at its forward portion with an internal recess 38 for receiving and seating a focusing lens 39. A second recess 40, positioned forwardly of the lens-receiving recess 38, is internally threaded at 41 for the reception of externally threaded walls 42 of an annular lens bezel 43. The bezel can be easily installed and removed to accommodate changing or cleaning the lens 39, for example. Additionally, it sometimes is desired to install a light-altering filter 44 behind the lens 39 for enhanced display effects.

As reflected particularly in FIG. 3, the focusing member 36 is joined with the pivot element 20 by engaging the respective threaded portions 31, 34 and rotating the focusing member. This is easily accomplished by first tightening the locking ring 25 to secure the pivot element 20 against rotation. Once the focusing member 36 is installed, its axial position, relative to the pivot element 20, can be altered for focusing purposes by rotating the focusing element clockwise or counterclockwise, as may be desired.

A fiber optic bundle 45, in itself well known, is inserted through the back end of the pivot element 20. The fiber optic bundle typically comprises a plurality of optical fibers encased in a sheath 46 and provided at the end with a terminal collar 47 which exposes the ends 48 of the optical fibers. At its "upstream" end (not shown) the fiber optic bundle is associated with a suitable light source (not shown), such as the FOMH-100 Illuminator, marketed by Lighting Services Inc. of Stony Point, N.Y. The light source may be positioned at a suitably remote location, and may provide the input illumination to a plurality of fiber optic bundles, each leading to a spotlight fitting of the type described herein.

As shown in FIG. 3, the fiber optic bundle is inserted through the back of the pivot element 20 and into the internal passage 49 of the tubular extension, to position the exposed ends 48 of the optical fibers at a predetermined distance beyond the forward end of the pivot element 20. The fiber optic bundle is secured in the desired position by means of a resilient compression fitting 50 (FIGS. 2 and 3) which surrounds the bundle 45 and is received within the back recess 32 of the pivot element. A retaining cap 51, previously applied over the end of the fiber optic bundle, is formed with internally threaded side walls 52 engageable with an externally threaded cylindrical wall 53 at the back of the pivot element. After the compression fitting is seated within the recess 32, the retaining cap 51 is applied over the back of the pivot element and tightened by means of the interengaging threads 52, 53 to axially compress the compression fitting 50 and cause it to tightly grip the fiber optic bundle and fix its position relative to the pivot element 20. If desired, the compression fitting may be provided with a slotted side wall to facilitate the gripping action on the fiber optic bundle.

After the retaining cap 51 has been tightened, the fiber optic bundle is retained in an axially fixed position relative to the pivot element 20, substantially as indicated in FIG. 3, with the exposed ends 48 of the optical fibers positioned adjacent the convergent end of the reflecting shroud 37. By rotating the focusing member 36 relative to the pivot element 20, the distance of the lens 39 from the exposed ends 48 of the optical fibers can be varied, to concentrate or disperse the pattern of light emitted from the fixture, as may be desired. Independently, the aiming of the fixture can be adjusted by simply loosening the locking ring 25 and manipulating the focusing element 36 as necessary to position the illuminated area in the desired position. Tightening of the locking ring 25 then secures the pivot element 20 in its adjusted position. Aiming and focusing adjustments thus can be accomplished completely independently of each other, if desired.

It will be understood, of course, that the fiber optic bundle 45 is relatively flexible, and easily accommodates the various angular manipulations of the pivot element 20 to enable universal aiming of the focusing member within angular limits of the device.

The device of the invention is of a particularly simplified and economical construction, and is easy to install and operate. Precise adjustment of the display illumination is easily accomplished by way of simple focusing adjustments (rotation of the focusing member 36) and aiming adjustments (universal pivoting of the pivot member 20 about its seat in the pivot housing). The fiber optic cable is easily connected to the device by simply inserting it through the back of the device and locking it in place by means of the compression fitting 50 and retaining cap 51. The device is extremely compact and is very unobtrusive when mounted in a display case, for example.

It should be understood of course that the specific forms of the invention herein illustrated and described are representative only as a wide variety of modifications are contemplated within the scope and teachings of the invention. Accordingly, reference should be made to the following appended claims for determining the full scope of the invention.

The invention claimed is:

1. An adjustable spotlight fitting for an illuminated fiber optic bundle, to provide independent aiming and focusing of a light beam emanating from said fiber optic bundle, which comprises
   (a) a pivot housing having front and back ends and a hollow interior,
   (b) a partially spherical pivot element received within said hollow interior for limited universal pivoting movement with respect to said pivot housing,
   (c) said pivot element having front and back ends and having front and back coaxially aligned and connected recesses,
   (d) a fiber optic bundle having an outlet end for the discharge of light,
   (e) the outlet end of said fiber optic bundle being received within and secured within the back recess of said pivot element, positioned to emit light forwardly through the front recess of said pivot element,
   (f) means engaging said fiber optic bundle adjacent said outlet end for positioning and retaining said fiber optic bundle within said pivot element, (g) an adjustable focusing member having front and back end portions and mounting a focusing lens at said front end portion, (h) the back end portion of said adjustable focusing member comprising a tubular extension adjustably positioned within the forward recess of said pivot element for limited axial movement therein relative to said pivot element and the outlet end of said fiber optic bundle, (i) the front end portion of said focusing member comprising a shroud portion mounting said focusing lens, (j) manually engageable locking means for securing said pivot element in an adjusted position, (k) said focusing member and said pivot element being independently movable for effecting independent focusing and aiming adjustment of said light beam, and (l) said focusing member being adjustable in all operative orientations of said pivot element for effecting expansion and contraction of said light beam, and said pivot element being adjustable in all operative positions of said focusing member for adjusting aiming of said light beam.

2. A spotlight fitting according to claim 1, wherein (a) said pivot housing includes an internal flange for engaging and supporting a rear portion of said spherically contoured pivot element, (b) said manually operable locking means comprises a ring-like member engageable with forward portions of said pivot housing and having a surface engageable with a forward portion of said pivot element for securing said pivot element in an adjusted pivot position, and (c) said ring-like member threadedly engages said pivot housing, whereby said pivot element can be locked in position or released for adjustment by manual rotation of said ring-like member.

3. A spotlight fitting according to claim 1, wherein (a) said tubular extension includes an externally threaded portion, and (b) the front recess portion of said pivot element includes an internally threaded portion engageable with the externally threaded portion of said tubular extension, (c) whereby rotation of said focusing member relative to said pivot element results in controllable axial focusing adjustment of said focusing member and said focusing lens.

4. A spotlight fitting according to claim 3, wherein said adjustable focusing member comprises an annular lens bezel removably engageable with forward end portions of said shroud for securing said lens in position in said shroud.

5. An adjustable spotlight fitting for use with an illuminated fiber optic bundle, to provide independent aiming and focusing of a light beam emanating from said fiber optic bundle, which comprises (a) a partially spherical pivot element, (b) a pivot housing supporting said pivot element for universal pivoting motion, (c) said pivot element having an axial passage therethrough, (d) an adjustable focusing member mounting a focusing lens at a front portion thereof, (e) said focusing member having a back portion mounted on a front portion of said pivot element and being axially movable with respect to said pivot element over a predetermined range of axial adjustment, (f) a flexible fiber optic bundle extending through the axial passage in said pivot member and terminating adjacent a front portion of said passage, (g) means for securing said fiber optic bundle in a fixed position in said passage, (h) said focusing member being movable with said pivot element, over a full range of motion of pivoting movements of said pivot element for adjustment of aiming of said light beam, and being movable axially relative to said fiber optic cable over said predetermined range of adjustment in any operative position of said pivot element for effecting contraction and expansion of said light beam.

6. An adjustable spotlight fitting according to claim 5, wherein (a) said focusing member includes a shroud, (b) said shroud having a recess in a forward portion thereof for receiving said focusing lens, (c) an annular lens bezel removably secured to a front portion of said shroud, forward of said lens, for removably retaining said lens in said recess.

7. An adjustable spotlight fitting according to claim 5, wherein (a) said pivot element has a rearwardly opening recess portion surrounding a portion of said fiber optic bundle and having a diameter greater than a diameter of said bundle, (b) a compression element is received in said recess portion in surrounding relation to said fiber optic bundle, and (c) a retaining cap is secured to a back portion of said pivot element for placing said compression element under compression, whereby said fiber optic bundle is gripped and retained in fixed position relative to said pivot element.

8. An adjustable spotlight fitting according to claim 5, wherein (a) said pivot housing has a front end portion and an internal surface for movably seating said pivot element, and (b) a locking ring is adjustably engageable with the front end portion of said pivot housing and has confining surfaces bearing on said pivot element for locking and releasing said pivot element against and for universal pivoting movement relative to said pivot housing.

9. An adjustable spotlight fitting for use with an illuminated fiber optic bundle, to provide independent aiming and focusing of a light beam emanating from said fiber optic bundle, which comprises (a) a partially spherical pivot element, (b) a pivot housing supporting said pivot element for universal pivoting motion, (c) said pivot element having an axial passage therethrough, (d) an adjustable focusing member mounting a focusing lens at a front portion thereof, (e) said focusing member having a back portion mounted on a front portion of said pivot element and being axially movable with respect to said pivot element over a predetermined range of axial adjustment, (f) a flexible fiber optic bundle extending through the axial passage in said pivot member and terminating adjacent a front portion of said passage, (g) means for securing said fiber optic bundle in a fixed position in said passage, (h) said focusing member being movable with said pivot element, over a full range of motion of pivoting movements of said pivot element for adjustment of aiming of said light beam, and being movable axially relative to said fiber optic cable over said predetermined range of adjustment in any operative position of said pivot element for effecting contraction and expansion of said light beam.
(i) said focusing member includes a shroud,
(j) said shroud having a recess in a forward portion thereof for receiving said focusing lens,
(k) said focusing member includes a tubular extension joined with said shroud and extending rearwardly therefrom,
(l) said tubular extension has an internal passage surrounding and slideably receiving said fiber optic bundle and received within a forward portion of the axial passage through said pivot element,
(m) said tubular extension and said axial passage having interengaging means accommodating controlled axial adjustment of said focusing member relative to said pivot member.

10. An adjustable spotlight fitting according to claim 9, wherein
(a) said interengaging means comprises externally threaded portions of said tubular extension and internally threaded portions of said axial passage.

* * * * *